United States Patent [19]

Takamiya et al.

[11] Patent Number: 5,194,745
[45] Date of Patent: Mar. 16, 1993

[54] DOPPLER VELOCIMETER

[75] Inventors: Makoto Takamiya, Kawasaki; Yasuhiko Ishida, Tokyo; Hidejiro Kadowaki; Hiroshi Sugiyama, both of Yokohama; Ken Tsuchii, Tokyo; Kosuke Yamamoto, Yokohama, all of Japan

[73] Assignee: Canon Kabushiki Kaisha, Tokyo, Japan

[21] Appl. No.: 905,147

[22] Filed: Jun. 23, 1992

Related U.S. Application Data

[63] Continuation of Ser. No. 702,386, May 20, 1991, abandoned.

[30] Foreign Application Priority Data

May 21, 1990 [JP] Japan ................... 2-130588
May 21, 1990 [JP] Japan ................... 2-130589
May 21, 1990 [JP] Japan ................... 2-130620

[51] Int. Cl.$^5$ ........................................... G01N 21/86
[52] U.S. Cl. ................................. 250/561; 356/28.5
[58] Field of Search ............... 250/561, 335; 356/28, 356/28.5

[56] References Cited

U.S. PATENT DOCUMENTS

| | | | |
|---|---|---|---|
| 3,952,191 | 4/1976 | Tinet | 250/201 |
| 4,036,557 | 7/1977 | Christensen | 356/28.5 |
| 4,470,696 | 9/1984 | Ballard | 356/28.5 |
| 4,525,068 | 6/1985 | Mannava et al. | 356/28.5 |
| 4,835,755 | 5/1989 | Kusano | 369/44 |
| 5,000,567 | 3/1991 | Fleshner | 356/28.5 |

FOREIGN PATENT DOCUMENTS 0151682 8/1985 European Pat. Off. .
2010629 6/1979 United Kingdom .
2167262 5/1986 United Kingdom .

OTHER PUBLICATIONS

Radio Fernsehen Elektronik. vol. 33, No. 1 Jan. 1984, Berlin DD pp. 49-50; M. Tank: 'Die Compact-Disc'.

Primary Examiner—David C. Nelms
Assistant Examiner—T. Davenport
Attorney, Agent, or Firm—Fitzpatrick, Cella, Harper & Scinto

[57] ABSTRACT

An apparatus for detecting the velocity information of an object comprises the irradiation optical system for performing the irradiation of beam to the predetermined position on an object to be measured; the photodetector for detecting the light from the irradiated object by the irradiation optical system, the velocity information being obtained by the detection; the detector for detecting the irradiating state for detecting the deviation of the irradiating position of the beam on the object to be measured; and the adjuster for adjusting the irradiating state of the beam on the object based on the detection result of the detector for detecting the irradiating state. With such constituents as above, the apparatus is capable of dealing with the fluctuation of the lightning to obtain a high-precision detection of the velocity information at a high speed.

27 Claims, 11 Drawing Sheets

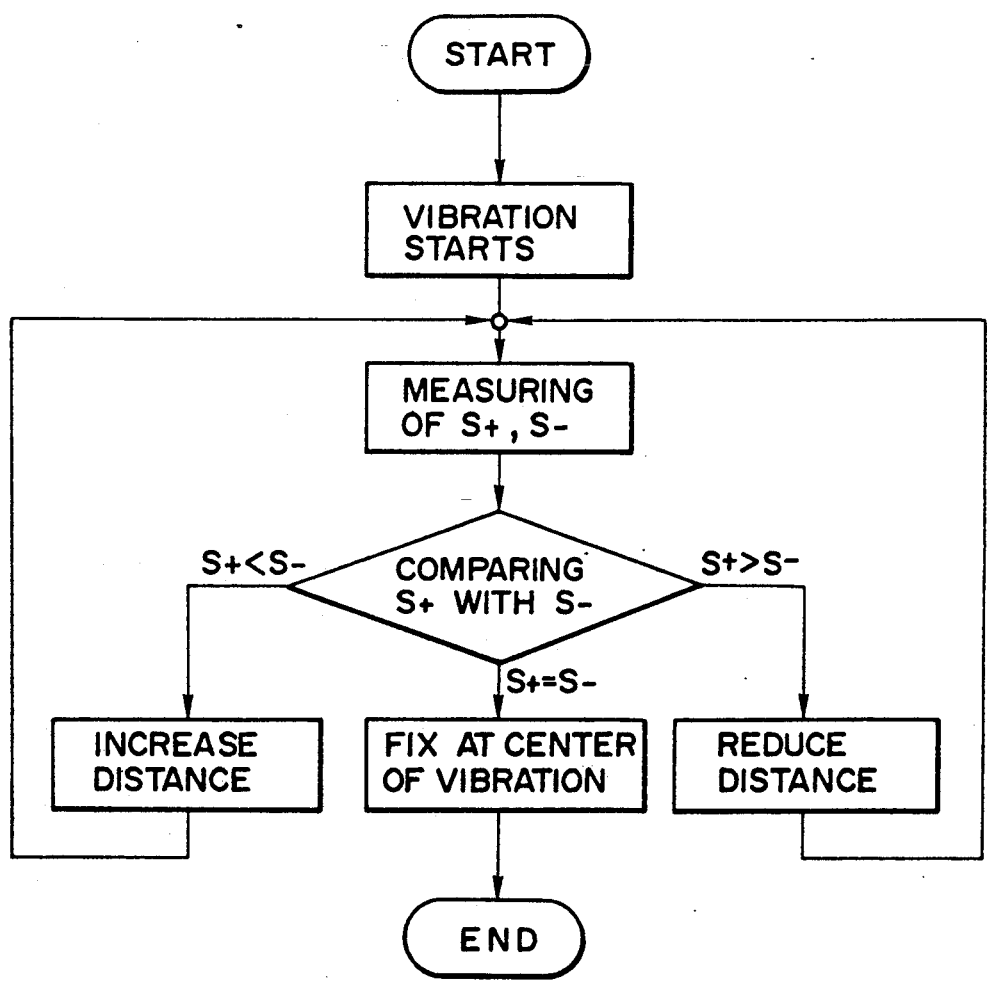

DOPPLER VELOCIMETER

This application is a continuation of application Ser. No. 07/702,386, filed May 20, 1991 now abandoned.

BACKGROUND OF THE INVENTION

1. Field of the Invention

The present invention relates to a detector for detecting information of the displacement of a moving object or fluid (hereinafter referred to as moving object), or a velocimeter for measuring the velocity of a moving object without contacting the object, such as a laser Doppler velocimeter for the measurement by detecting the frequency shift of laser light.

2. Related Background Art

Traditionally, the laser Doppler velocimeter has been in use as an apparatus for performing a noncontact high-precision measurement of the traveling velocity of a moving object. The laser Doppler velocimeter is an apparatus for measuring the traveling velocity of the moving object by the utilization of the effect (Doppler effect) that the frequency of scattering light by the moving object is shifted in proportion to its traveling velocity when light beam such as laser light is radiated onto the moving object.

An example of the conventional laser Doppler velocimeter is schematically shown in FIG. 1 to illustrate its structure.

In FIG. 1, a reference numeral 1 designates a laser light source; 2, a collimator lens; 3, parallel beam; 4, a beam splitter; 6a and 6b, reflection mirrors; 7, a moving object in the direction indicated by an arrow at a traveling velocity V; 8, a condenser lens; and 9, a photodetector.

The laser light emitted from the laser light source 1 is produced into the parallel beam 3 by the function of the collimator lens 2, and splitted into two beams 5a and 5b by the beam splitter 4. The splitted beams 5a, 5b are reflected by the reflection mirrors 6a and 6b, respectively, and are irradiated at an incident angle $\theta$ by the two-beam irradiation onto one and a same position on the moving object 7 at the traveling velocity V. The scattering light from the moving object at that time is detected by the photodetector 9 through the condenser lens 8. The frequency of the scattering light by the two beams is proportional to the traveling velocity V and affected by the Doppler shift of $+\Delta f$ and $-\Delta f$, respectively. Now, given the wavelength of the laser light as $\lambda$, the $\Delta f$ can be expressed in an equation (1) given below.

$$\Delta f = V \cdot \sin(\theta)/\lambda \tag{1}$$

The scattering lights affected by the Doppler shifts, $+\Delta f$ and $-\Delta f$, interfere with each other to result in the variation of light intensity on the light receiving plane of the photodetector 9. Its frequency F is obtainable by an equation (2) given below.

$$F = 2 \cdot \Delta f = 2 \cdot V \cdot \sin(\theta)/\lambda \tag{2}$$

With the measurement of the frequency F (hereinafter referred to as Doppler frequency) of the photodetector 9 by the equation (2), the traveling velocity V of the moving object 7 can be obtained.

In such a laser Doppler velocimeter as in the above example of the conventional art, the Doppler frequency F is inversely proportional to the laser wavelength $\lambda$ as understandable from the equation (2). Therefore, it is necessary to use a laser light source capable of emitting a light having stable wavelength for the laser Doppler velocimeter. As a laser light source capable of continuous transmission with a stable wavelength, a gas laser such as He—Ne is often employed, but the size of its laser oscillator is large and a high voltage power source is needed. Accordingly, the apparatus becomes large and expensive. On the other hand, the laser diode (or semiconductor laser) employed for a compact disc, video disc, optical fiber communications or the like is very small and easy to drive. However, a stable output is hardly obtainable due to its temperature dependence.

FIG. 2 (quoted from Optical Semiconductor Devices compiled in Mitsubishi Semiconductor Data Book 1987) illustrates an example of the typical temperature dependence of a laser diode. The portion where the wavelength changes continuously is mainly caused by the temperature changes of the refractive index of the active layer of the laser diode, which is 0.05–0.06 nm/°C. The portion where the wavelength changes discontinuously is called longitudinal mode hopping, which is 0.2–0.3 nm/°C.

In order to stabilize the wavelength, a controlling method is usually adopted to maintain the laser diode at a constant temperature. Such method requires the installation of the temperature control members such as heater, radiator, and temperature sensor with small thermal resistance to control the temperature precisely. This makes the laser Doppler velocimeter comparatively large in its size and high in its cost, in addition, it is still impossible to eliminate completely the unstableness resulting from the longitudinal mode hopping.

With a view to solving the above-mentioned problem, a method for detecting the scattering lights from a moving object or fluid by the use of a photodetector (hereinafter referred to as G-LDV) has been proposed, for example, in U.S. Ser. No. 501,499 as a laser Doppler velocimeter, in which the laser light as the light source is incident on a diffraction grating, and the two of the obtainable diffracted lights, which are +n order and −n order (n is 1, 2, and, ... ) except zero order, are irradiated onto the moving object at an intersecting angle which is same angle formed by the two-beam irradiation.

FIG. 3 illustrates an example of diffraction wherein a laser light I is incident on a transmission type diffraction grating 10 having a grating pitch d, perpendicularly to the direction t in which the grating is arrayed, and the diffraction angle $\theta_0$ is expressed by an equation given below.

$$\sin \theta_0 = m\lambda/d$$

where m is the diffraction order (0, 1, 2, and ... ) and $\lambda$ is the wavelength of light.

Here, the light of $\pm n$ order other than zero order is expressed by an equation given below.

$$\sin \theta_0 = \pm n\lambda/d \tag{3}$$

where n is 1, 2, and ...

FIG. 4 is a view illustrating the two-beam irradiation of said $\pm n$ order light onto the moving object 7 by the use of the mirrors 6a and 6b in such a manner that its incident angle becomes $\theta_0$. The Doppler frequency F of the photodetector 9 is expressed by an equation given below, obtained from the equations (2) and (3):

$$F = 2V \sin(\theta_0)/\lambda \quad (4)$$
$$= 2nV/d$$

The Doppler frequency F does not depend on the wavelength of the laser light I, and is inversely proportional to the grating pitch d of the diffraction grating 10 and is proportional to the traveling velocity V of the moving object 7. Because the grating pitch d is sufficiently stable, the frequency proportional to only the traveling velocity V of the moving object 7 is obtainable as the Doppler frequency F. In this respect, when a reflection type diffraction grating is used as the grating 10, same result will be obtained.

SUMMARY OF THE INVENTION

The present invention is an improvement of the example set forth above, and a first object thereof is to provide a higher precision Doppler velocimeter to deal particularly with the fluctuation of the irradiating position.

A second object of the present invention is to provide a high-precision Doppler velocimeter capable of setting its two-beam spot in an reliably overlapped state.

Other objects of the present invention will be clear in the detailed description to be made later of the embodiments thereof.

BRIEF DESCRIPTION OF THE DRAWINGS

FIG. 11 is a flowchart showing the control flow of the second embodiment.

DESCRIPTION OF THE PREFERRED EMBODIMENTS

Figure 1:
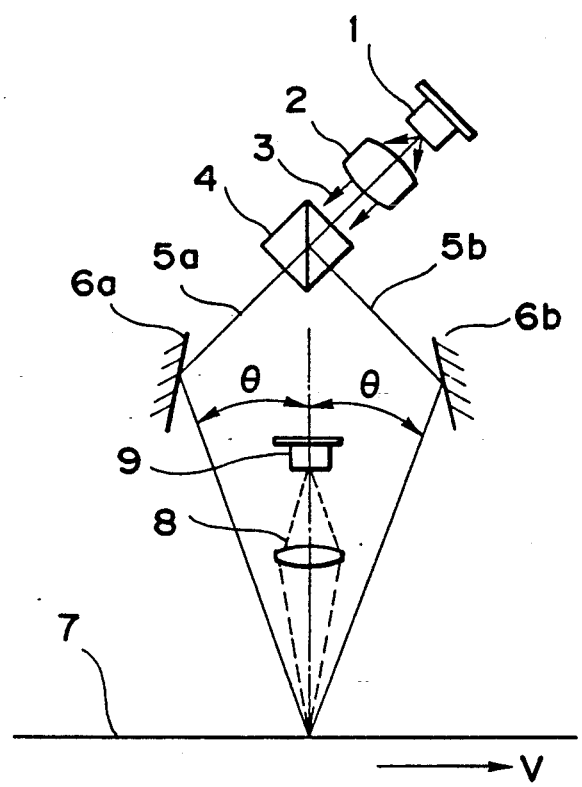
FIG. 1 is a view schematically showing a conventional Doppler velocimeter.
Figure 2:
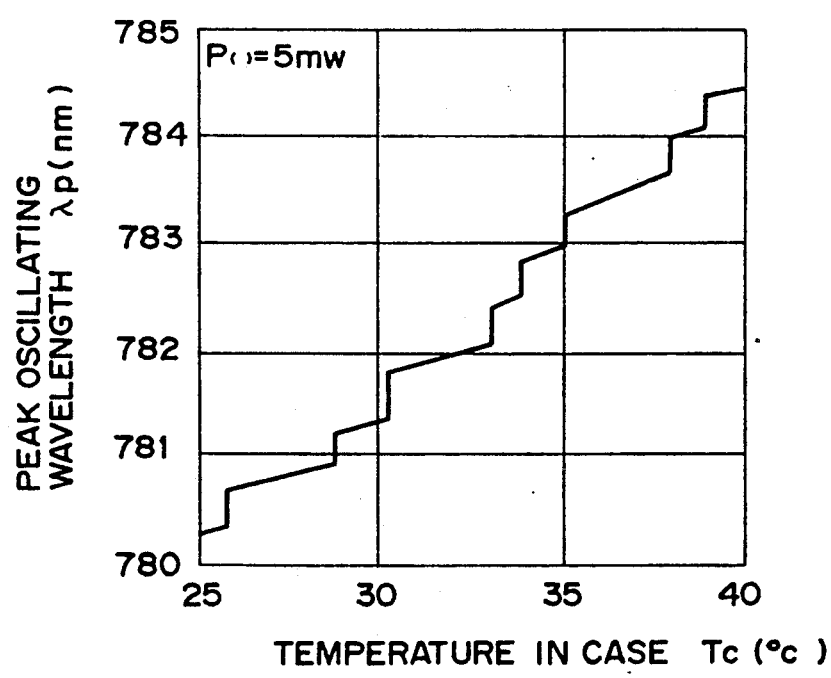
FIG. 2 is a graph showing the temperature dependence of the ocillating wavelength of a laser diode.
Figure 3:
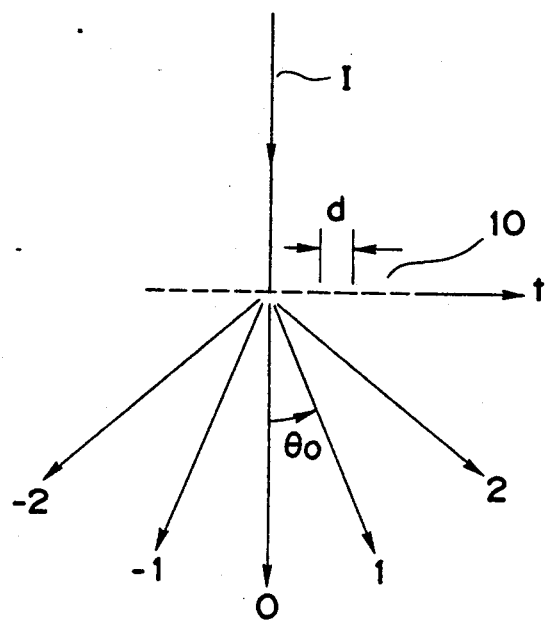
FIG. 3 is a view illustrating each order of the diffraction light diffracted by a diffraction grating.
Figure 4:
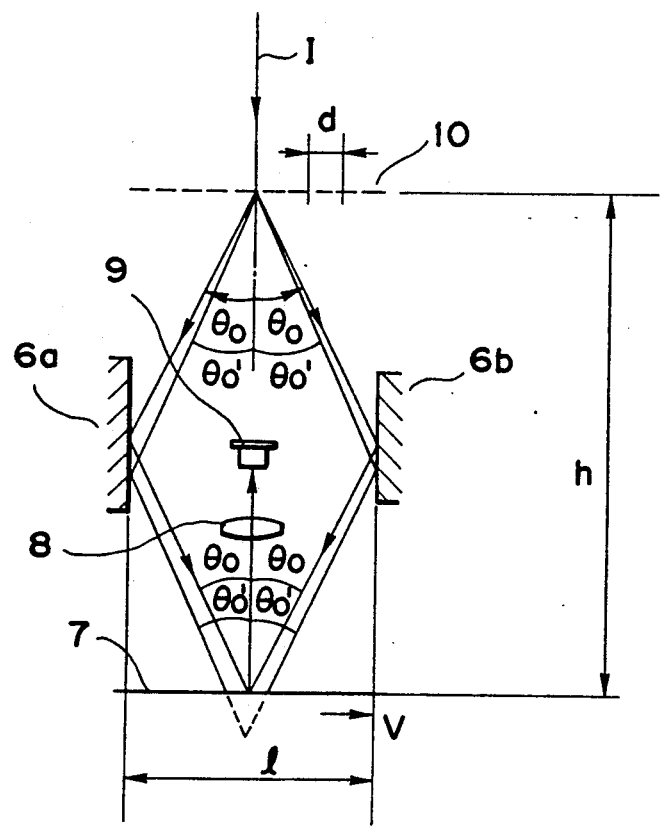
FIG. 4 is a view schematically showing a Doppler velocimeter, the Doppler frequency of which does not depend on the wavelength.
Figure 5:
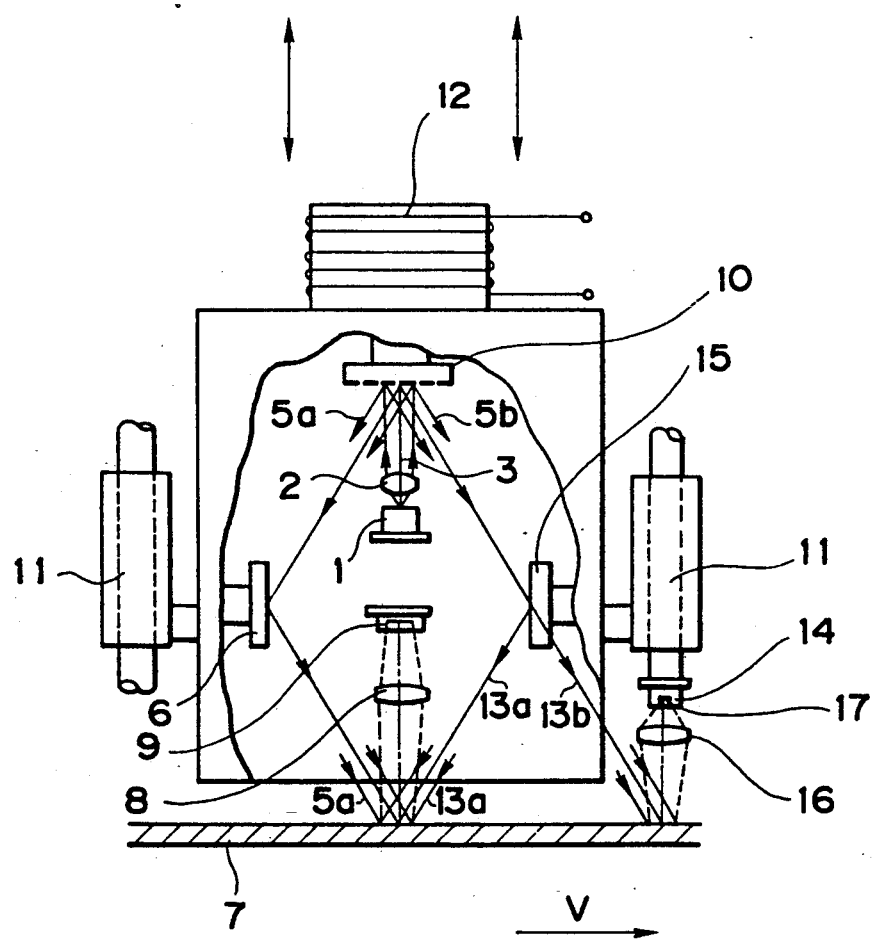
FIG. 5 is a view schematically showing a first embodiment of the present invention.

FIG. 5 is a view schematically showing a first embodiment of the present invention, in which the same reference marks are applied to the members which are the same as or equivalent to those appearing in the conventional example. When the parallel beam 3 of 2 mm$\phi$ emitted from the laser light source 1 (laser diode) and then collimated by the collimator lens 2 are incident on the reflection type diffraction grating 10 with the grating pitch of 1.6 $\mu$m, capable of taking out the $\pm$ primary order efficiently, perpendicularly to the direction in which the grating is arrayed, the parallel lights are beam-splitted into the diffraction rights 5a and 5b (diffraction angle $\theta_0$) of $\pm$ primary order. One of the beams (beam 5a) is reflected by the mirror 6 perpendicular to the direction in which the grating is arrayed, and the other one (beam 5b) is splitted into the reflected light 13a and transmitted light 13b by the half mirror 15 perpendicular to the direction in which the grating is arrayed. The beam 5a and the beam 13a are overlapped and are irradiated onto the moving object 7 by the two-beam irradiation at a incident angle $\theta_0$ in a spot diameter of approximately 2 mm$\phi$. Then, the scattering lights from the moving object 7 are focused by the condenser lens 8 as a spot on the light receiving plane of the photodetector 9, thereby being detected by the photodetector 9; thus obtaining the Doppler signal expressed by the equation (4). Here, the Doppler signal given below is obtained, which does not depend on the wavelength $\lambda$ obtainable as n=1.

$$F = 2V/d \quad (5)$$

On the other hand, the transmitted light 13b passing through the half mirror 15 is diagonally incident on the surface of the moving object 7 from the diagonal direction as a reference beam for the positional detection to form a spot of approximately 2 mm$\phi$ on the moving object 7 at a position different from the position where said two beams 5a, 13a are irradiated. With a light receiving lens 16, an image is formed by this spot on a four-division sensor 14 which functions as an optical position sensor with four light receiving elements 17 arranged on a line, and the positional information of the spot is obtained by the output from each of the light receiving elements 17. These optical systems are arranged so that the image is formed by the spot in the center of the light receiving elements 17 when the intersecting position of the two beams 5a, 13a and the position of the moving object 7 are matched.

Based on this spot positional information, the laser Doppler velocimeter is travelled along a guide 11 by a voice coil 12 in the direction perpendicular to the moving object 7. The determination of the spot position and the driving of the voice coil 12 to follow in accordance therewith are performed by a control circuit (not shown).

FIG. 6 is a view illustrating a method for detecting the deviation of the two-beam spot. FIG. 6AA, FIG. 6AB and FIG. 6AC illustrate a state in which the moving object 7 is closer to the velocimeter than the intersecting position of the two beams 5a, 13a. FIG. 6BA, FIG. 6BB and FIG. 6BC illustrate the ideal state in which the intersecting position of the two beams 5a, 13a are the position of the moving object 7 are matched. FIG. 6CA, FIG. 6CB and FIG. 6CC illustrate a state in which the moving object 7 is father away from the velocimeter than the intersecting position of the two beams 5a, 13a. The state shown in FIG. 6BA, FIG. 6BB and FIG. 6BC is the best for the detecting signal. In other states, the detecting signal is small because the two beams 5a, 13a are deviated from each other, and in a worse condition, the detecting signal disappears completely. This is caused by the face that the Doppler frequency signal can be obtained only from the portion where the two beams 5a, 13a are overlapped. In each of the these figures, FIGS. 6AA, 6BA and 6CA are views illustrating the optical path of the laser Doppler velocimeter of the embodiment; FIGS. 6AB, 6BB and 6CB are views showing the state of the optical spot on the moving object 7; and FIGS. 6AC, 6BC and 6CC are views showing the state of the spot image-formation of the beam 13b on the four-division sensor 14.

Figure 6A:
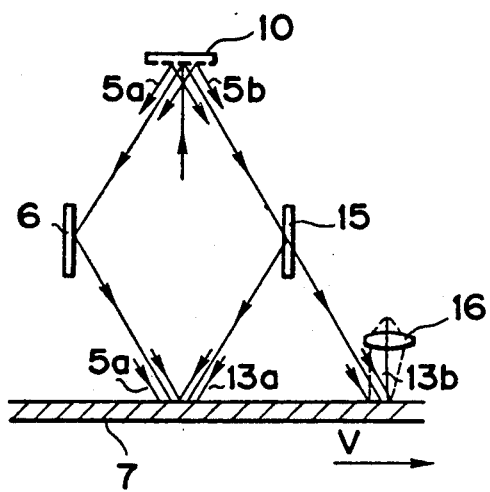
FIGS. 6AA to 6CC are views illustrating the principle of the first embodiment.
Figure 6B:
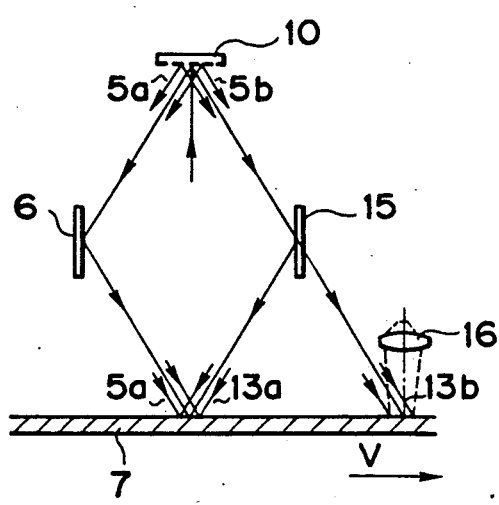
Figure 6A:
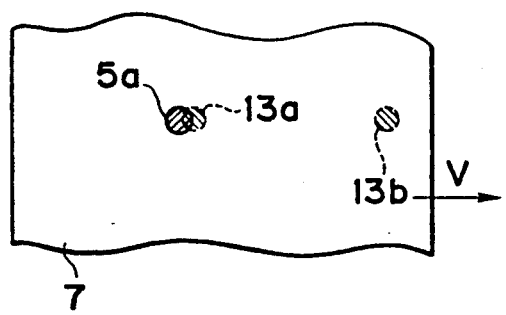
Figure 6B:
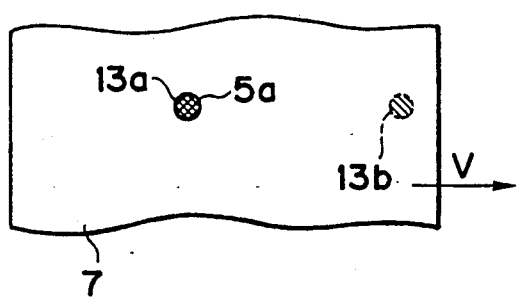
Figure 6A:
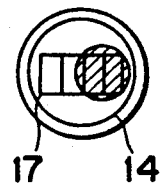
Figure 6B:
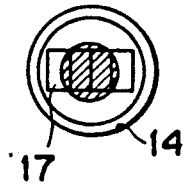
Figure 6C:
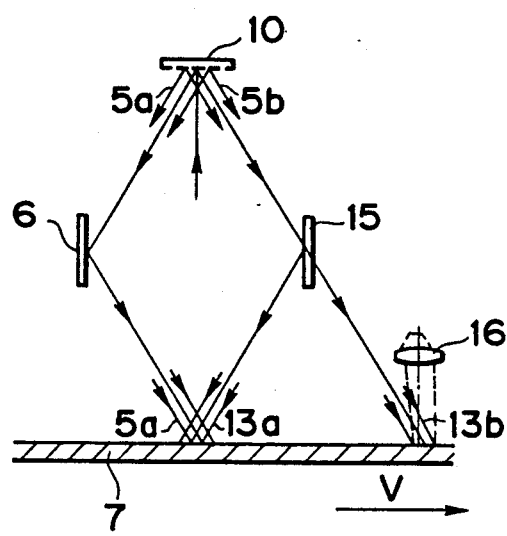
Figure 6C:
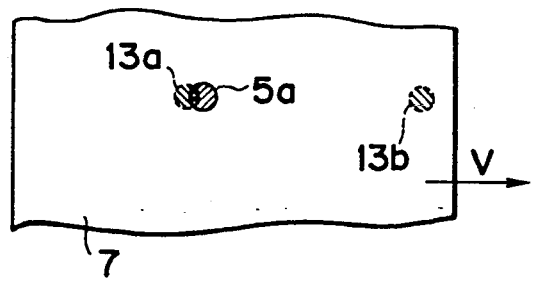
Figure 6C:
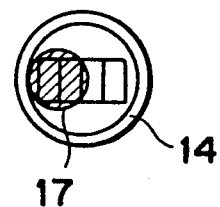

In the state shown in FIGS. 6BA, 6BB and 6BC the detection is made with high detection level in the central two light receiving elements 17 of the four-division sensor 14, and is hardly made in the both end two of light receiving elements 17. As the state shown in FIGS. 6BA, 6BB and 6BC is shifted to the state shown in FIGS. 6AA, 6AB and 6AC, the spot of the beam 13b on the moving object 7 is gradually shifted to the left-hand side because the beam 13b is diagonally irradiated. In the state shown in FIGS. 6AA, 6AB and 6AC, the detection is made with high detection level in the right-hand two of the light receiving elements 17. Also, as the state shown in FIGS. 6BA, 6BB and 6BC is shifted to the state shown in FIGS. 6CA, 6CB and 6CC, the spot of the beam 13b on the moving object 7 is gradually shifted to the right-hand side. In the state shown in FIGS. 6AA, 6AB and 6AC, the detection is made with high detection level in the left-hand two of the light receiving elements 17.

Figure 7:
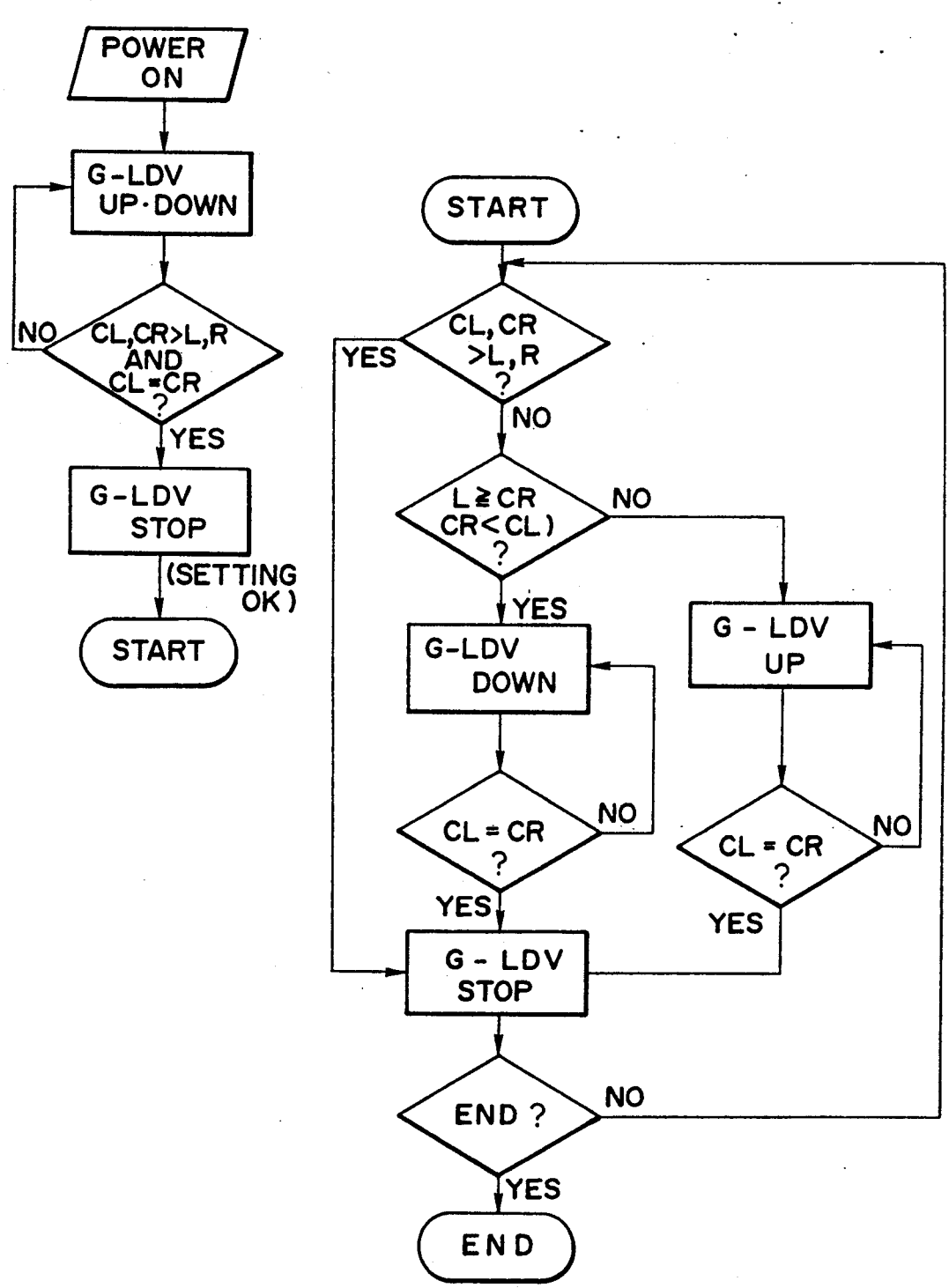
FIG. 7 is a flowchart showing the control flow of the first embodiment.

In other words, when the positional relationship between the moving object 7 and the intersecting position of the two beams 5a, 13a is adjusted so as to make the output from the central two of light receiving elements 17 to be highest detection level, the excellent detection signal can be always obtainable. FIG. 7 illustrates the specific procedure of this process. FIG. 7 is an example of the flowchart shown in the controlling procedure required to bring the two-beam spot into the ideal state shown in FIGS. 6BA, 6BB and 6BC. The controlling is performed by said control circuit (not shown) in accordance with the procedure indicated by the flowchart. Here, the detection level of each of the light receiving elements 17 of the four-division sensor 14 is R, CR, CL, and L from the right-hand element in FIG. 6, respectively. The UP and DOWN of G-LDV, i.e., the vertical traveling of the velocimeter, is performed by driving the voice coil 12.

In accordance with FIG. 7, this controlling will be described.

At first, the power source for the apparatus is turned on. Then, the velocimeter is travelled upward or downward in response to the initial position of the velocimeter. During the shifting, when the sum of the outputs CL and CR of the central two elements of the sensor 14 becomes greater than that of the outputs R and L of the both ends elements and CL=CR as well, the velocimeter is interpreted to arrive at the optimum measuring position, thereby stopping to travel. At the same time, a servo control begins to maintain this state. When the sum of the outputs CL and CR becomes greater than that of L and R, whether L is greater than CR (or CL is greater than R) is determined, if so, the velocimeter is actuated to move downward, and if not, the velocimeter is actuated to move upward. Then, when CL=CR, the shifting is stopped. This procedure is repeated until the measurement is terminated.

With such structure and function set forth above, it is possible to maintain the state in which the two-beam spot is reliably overlapped on the moving object 7, and this is not affected by the surface condition of the moving object 7.

In the above-mentioned embodiment, the example of using the positional photosensor having the four light receiving elements is shown as a desirable mode, but the divisional sensor is not limited to the one having four light receiving elements. It may also be possible to employ a divisional sensor having 2, 3, or 5 or more light receiving elements.

Also, in the above-mentioned embodiment, one beam of the two diffraction lights is splitted to perform the positional detection, but if both of the two diffraction lights are splitted, respectively, to perform the positional detection, it should be possible to perform the positional detection more reliably.

As the above describes, according to the present embodiment, it is possible to implement a high-precision Doppler velocimeter capable of obtaining stable Doppler signals without being affected by the surface condition of the moving object.

Figure 8:
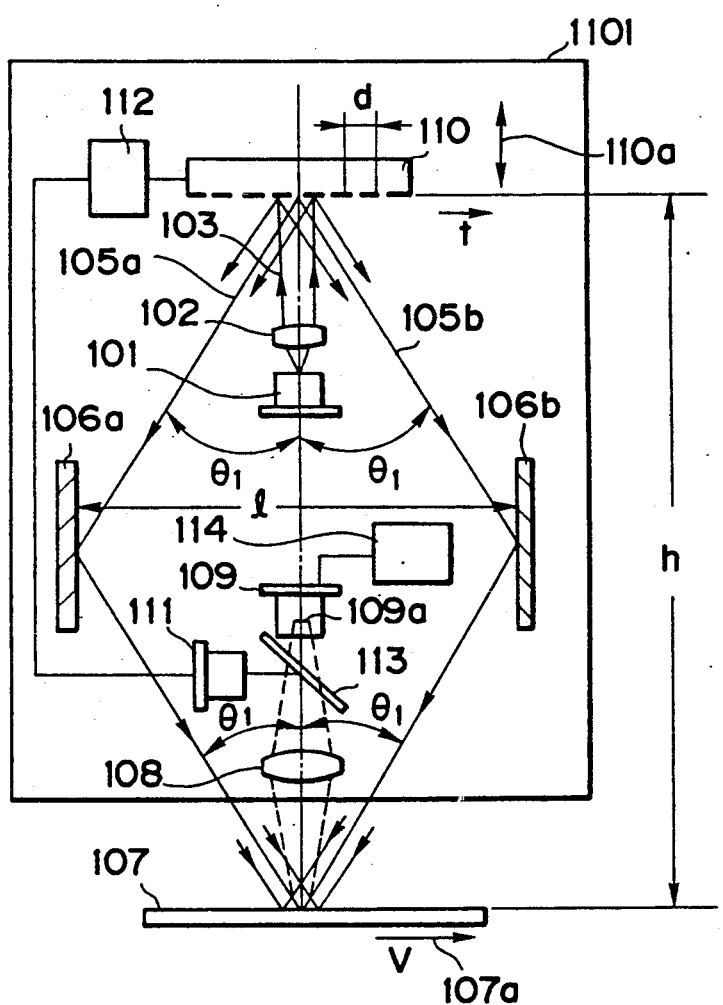
FIG. 8 is a view schematically showing a second embodiment of the present invention.

FIG. 8 is a view schematically showing the principal part of the optical system of a second embodiment according to the present invention, in which a numeral 1101 designates a Doppler velocimeter. A numeral 101 designates a light source comprising laser diode, semiconductor laser or the like (hereinafter referred to as laser). A numeral 102 designates a collimator lens which produces the parallel beams 103 from the beam emitted from the laser light source 101. A numeral 110 designates a diffraction grating in which the grating pitch d is set 1.6 $\mu$m so as to diffract the reflection type $\pm$ primary order diffraction light at the diffraction angle $\theta_1$. Numerals 106a and 106b designate the reflection mirrors which are arranged opposite to each other. A numeral 107 designates a moving object or a moving fluid (hereinafter referred to as moving object) which is being shifted in the direction indicated by arrow 107a at a traveling velocity V. A numeral 108 designates a condenser lens to converge through a half mirror 113 the scattering lights from the moving object 107 with the Doppler shift on the detection surface 109a of a photodetector 109, functioning as detecting means. A numeral 111 designates light receiving means comprising CCD and others, for example. The surface of the moving object 107 and the detecting surface 109a are substantially in a conjugate relationship. Also, the surface of the moving object 107 and light receiving means 111 are substantially in a conjugate relationship. A numeral 112 designates a driving means comprising a voice coil and others, for example, to shift the diffraction grating 110 in accordance with the output signal from the light receiving means 111 in the direction (indicated by arrow 110a) perpendicular to the traveling direction 107a of the moving object 107.

A numeral 114 designates computing means such as an electronic computer to obtain the traveling velocity V of the moving object 107 by computing using the Doppler signals obtainable by the photodetector 109.

In the present embodiment, the laser light emitted from the laser light source 101 is produced by the collimator lens 102 into the parallel beams 103 of approximately 2 mm diameter and incident on the reflection type diffraction grating 110 perpendicularly to the direction t in which the grating is arrayed. Then, the diffraction lights 105a and 105b of $\pm$n order (in the present embodiment n=1) diffracted by the diffraction grating 110 at the diffraction angle $\theta_1$ are reflected by the reflection mirrors 106a and 106b, respectively, and are irradiated crosswise onto the moving object 107 from the different direction at a same incident angle $\theta_1$, thereby to enable the spots $L_{5a}$ and $L_{5b}$ to be overlapped on the surface of the moving object 107 as shown in FIG. 9B.

In the present embodiment, an optical system is constructed with such structure as set forth above to provide the diffraction grating, mirrors, and others in which the diffraction angle of $\pm n$ order (of diffraction light) from the diffraction grating 110 is changed in response to the variation of the wavelength $\lambda$ and the incident angle $\theta$ to the moving object is changed, thereby, to make the ratio of $\sin(\theta)/\lambda$ substantially constant.

At this time, the two diffraction lights 105a and 105b are the spots $L_{5a}$ and $L_{5b}$ of approximately 2 mm diameter, thus irradiating the surface of the moving object 107 by the two beams.

The condenser lens 108 converges the scattering lights with the frequency shifted by the Doppler shift $\Delta f$ and $-\Delta f$ expressed by the equation (1) which is proportional to the traveling velocity V of the moving object 107, on the detecting surface 109a of the photodetector 109. At this time, the two scattering lights shifted by the Doppler shift $\Delta f$ and $-\Delta f$ interfere with each other on the detecting surface 109a. The photo detector 109 detects the quantity of light based on the brightness of the interference fringe at that time. That is the photo detector 109 detects the Doppler signal which does not depend on the oscillating wavelength $\lambda$ of the laser 101 of the Doppler frequency F, $$F = 2V/d \tag{5}$$

which is proportional to the traveling velocity V in the equation (4) where n=1 as described earlier. Then, the traveling velocity V is obtained by the equation (5) by means of the computing means 114 using the output signal from the photo detector 109.

In the present embodiment, the detecting surface 109a and the surface of the moving object 107 are substantially in a conjugate relationship. Therefore, provided that the relative relationship between the positions of the Doppler velocimeter 1101 and moving object 107 is correctly established and that the oscillating wavelength $\lambda$ from the laser 101 is invariable, the two diffraction lights 105a and 105b are irradiated to allow its spots $L_{5a}$ and $L_{5b}$ to be intersected to overlap with each other on the surface of the moving object 107 as shown in FIG. 9B.

Figure 9A:
FIGS. 9A to 9C are views illustrating the overlapping state of two beams.
Figure 9B:

However, if the oscillating wavelength of laser 101 fluctuates or there is an error in establishing the distance between the Doppler velocimeter 1101 and the moving object 107, the spots $L_{5a}$ and $L_{5b}$ of the diffraction lights 105a and 105b are not overlapped on the surface of the moving object 107 and are deviated from each other as shown in FIGS. 9A and 9B. The scattering lights detected by the photo detector 109 are scattering lights from the region where the two spots $L_{5a}$ and $L_{5b}$ are overlapped. Therefore, when the two spots $L_{5a}$ and $L_{5b}$ are not overlapped and begin to deviate from each other, the detecting level of the scattering lights, which can be detected by the photo detector 109, becomes small to cause the S/N ratio of the Doppler signal to be lowered. Hence, the measuring precision for the traveling velocity V is degraded.

For this reason, the overlapping condition of the two spots $L_{5a}$ and $L_{5b}$ on the surface of the moving object 107 are detected by the light receiving means 111 comprising CCD and others through the half mirror 113 in the present embodiment. Then, for example, the diffraction grating 110 is shifted by a driving means 112 in the direction perpendicular to the traveling direction indicated by arrow 101a of the moving object 107 in order to minimize the output distribution of the output signals obtained by the light receiving means 111, thereby making it possible to adjust the two spots $L_{5a}$ and $L_{5b}$ to be overlapped as shown in FIG. 9B.

Figure 9C:
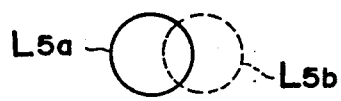

In this case, in order to determine whether the spot deviation is in a state shown in FIG. 9A or in a state shown in FIG. 9C, the process given below is executed. That is, when the light receiving means 111 detects the deviation, the diffraction grating 110 is vibrated by a driving means.

Figure 10A:
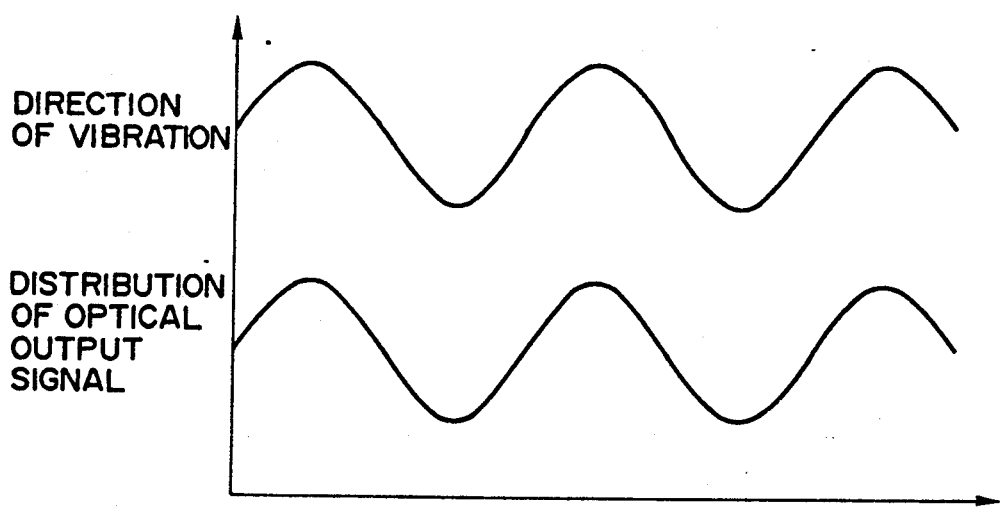
FIGS. 10A to 10C are views illustrating the method for detecting the directional deviation in the second embodiment.
Figure 10B:
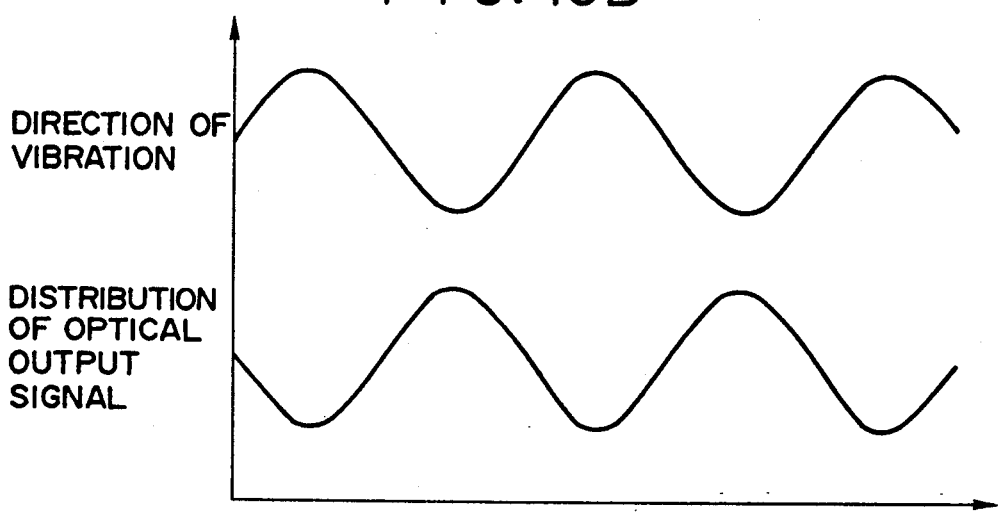
Figure 10C:
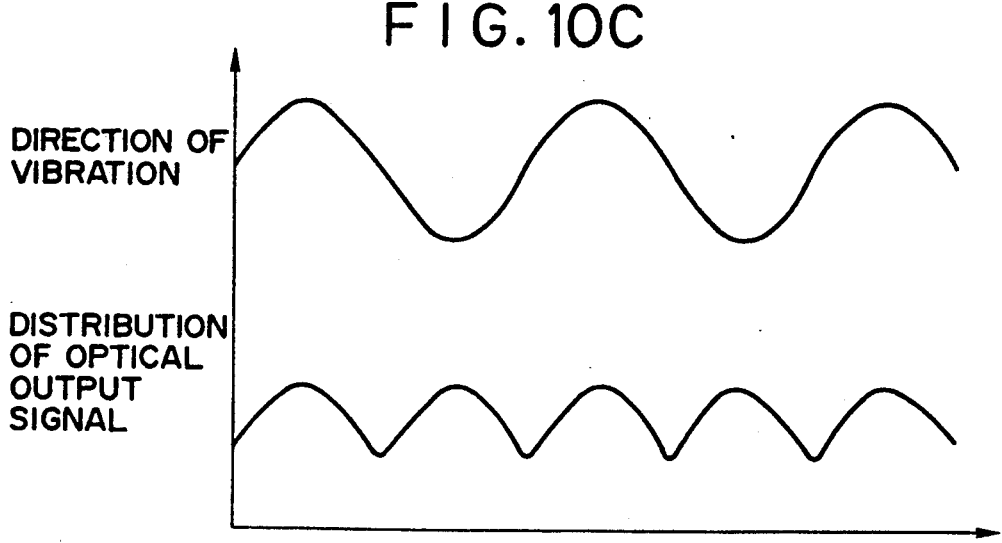

FIG. 10 represents graphs showing the relationship between the direction of vibration and the distribution of optical output signals from the light receiving means 111 at the respective distances between the diffraction grating 110 and the moving object 107. In FIG. 10, the shift in the direction in which the diffraction grating 110 travels away from the moving object 107 is defined as positive, and the shift in the approaching direction, negative. When the moving object 107 is away from the velocimeter, the distribution of the optical output signals is increased in the positive traveling direction and decreased in the negative traveling direction during the vibration as shown in FIG. 10A, i.e., the phases are identical. Next, when the moving object approaches the velocimeter, the distribution of the optical output signals is decreased in the positive traveling direction and increased in the negative traveling direction during the vibration as shown in FIG. 10B, i.e., the phases are inverse. Then, when the distance is appropriate, i.e., the spots are overlapped, the distribution values of the optical output signals are identical at a maximum of the vibration of sine wave and a minimum of the vibration as shown in FIG. 10C.

Therefore, in order to set the distance between the diffraction grating 110 and the moving object 107 correctly, the optical detection signal S+ at the time of the maximum sine-wave vibration is compared with the optical detection signal S− at the time of the minimum sine-wave vibration. If the condition is S+ > S−, the diffraction grating 110 should be adjusted to approach the moving object 107; if S+ < S−, to travel away from the moving object 107; and when S+ = S−, the diffraction grating 110 should be positioned in the center of the vibration and fixed there. FIG. 11 is a flowchart showing the flow of this vibration process.

It may also be possible to shift the diffraction grating 110 until the spots are overlapped by monitoring the spots with the light receiving means 111 subsequent to stopping of the vibration after having determined only the shifting direction of the diffraction grating by the method set forth above.

In this way, the relative relationship in the position between the irradiating position and the surface of the moving object is adjusted by the driving means 112 to enable the spots of the diffraction lights 105a and 105b diffracted by the diffraction grating 110 to be intersected to overlap with each other on the surface of the moving object 107 as shown in FIG. 9B. The S/N ratio of the Doppler signal thus obtained by the photo detector 109 is maintained in an excellent condition to make a high-precision detection of the traveling velocity of the moving object 107 possible.

Figure 12:
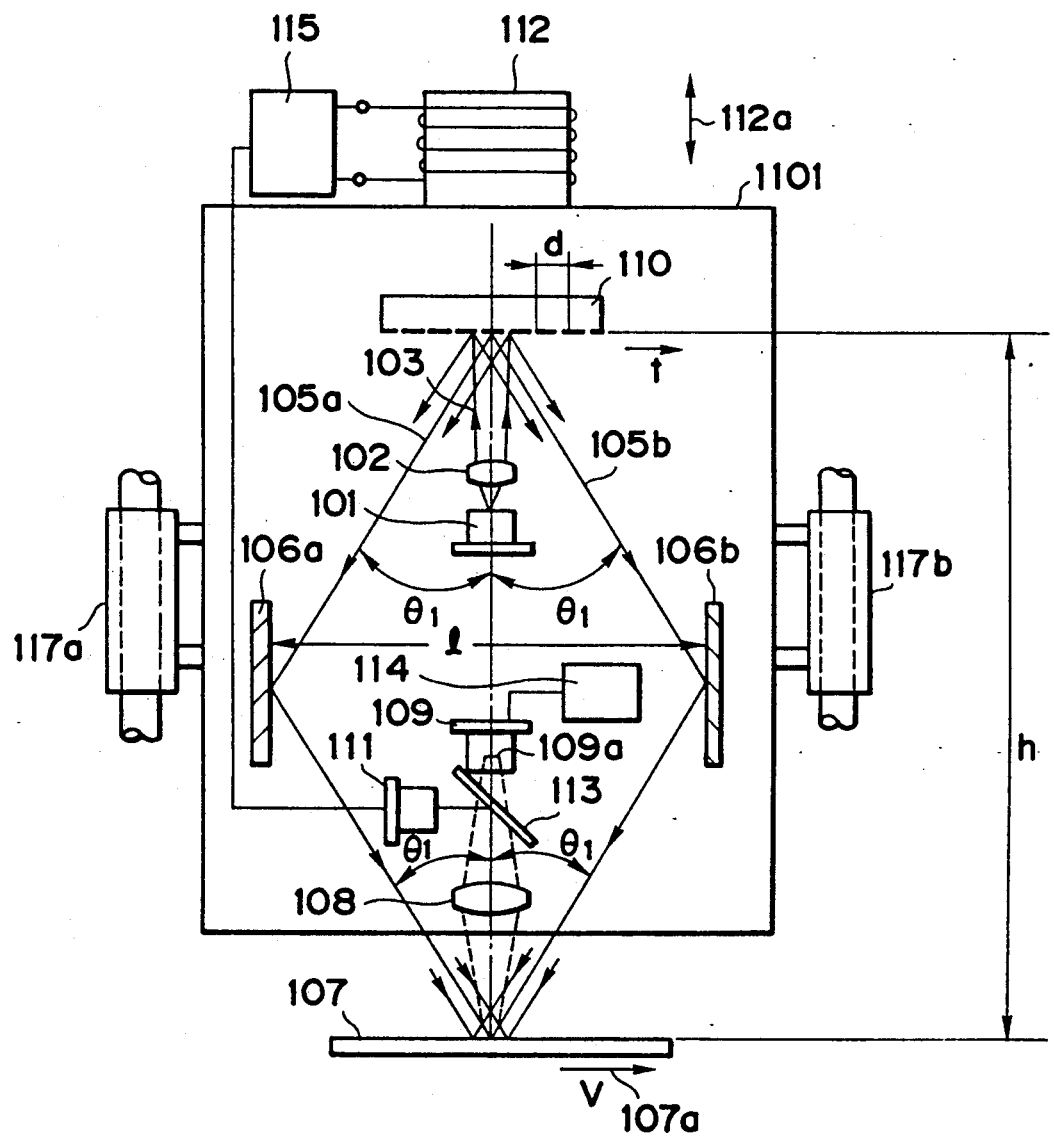
FIG. 12 is a view schematically showing a third embodiment of the present invention.

FIG. 12 is a view schematically showing the principle part of the optical system of a third embodiment according to the present invention.

In the present embodiment, as adjusting means for adjusting the relative relationship in the position between the irradiation position of the diffraction light on the moving object and the surface of the moving object, the driving means 112 comprising a voice coil, motor, or the like is used to shift and vibrate the Doppler velocimeter 1101 along guides 117a and 117b through a controlling means 115 in the direction perpendicular to the traveling direction 107a of the moving object 107 indicated by arrow 112a. The other structures than this are fundamentally the same as the second embodiment in FIG. 8.

In the present embodiment, the overlapping condition of the two spots $L_{5a}$ and $L_{5b}$ on the surface of the moving object 107 is detected by the light receiving means 111 comprising CCD and others through a half mirror 113, and the Doppler velocimeter 1101 is shifted by the driving means 112 in the direction perpendicular to the traveling direction of the moving object 107 indicated by arrow 112a to minimize the output distribution of the output signals obtained by said light receiving means 111, so that the two spots $L_{5a}$ and $L_{5b}$ are adjusted to be overlapped as shown in FIG. 9B.

It may also be possible to use the photo detector 109 for detecting the traveling velocity for the detection of the overlapping condition of the two diffraction lights 105a and 105b on the surface of the moving object 107 without using the light receiving means 111 in the second and third embodiments (in this case, the half mirror 113 is not required).

It may also be possible, for example, to vibrate the diffraction grating 110 or the Doppler velocimeter 1101 with small displacement by the driving means 112 in the direction indicated by arrow 110a to obtain a position where the detecting signal from the photo detector 109 is maximized (minimized in terms of the spot diameter). At this time, depending on whether the frequency phase of the detected signal obtained from the photo detector 109 is identical to the frequency phase of the driving signal or inverse, the distance between the moving object 107 and the Doppler velocimeter 1101 or the diffraction grating 110 is electrically judged to determine whether the distance is too close or too far.

In each of the above-mentioned embodiments, although the reflection type diffraction grating is used, a transmission type diffraction grating is applicable in the same manner. Also, besides the ± primary refraction light, it may be possible to use the second order or more for the diffraction light.

It may also be possible to input the laser light into the diffraction grating 10 and 110 at a specific angle, not necessarily the incident angle perpendicular thereto. Then, the two diffraction lights of ±n order diffraction light should be irradiated onto the moving object while maintaining the same intersecting angle as that of the two refraction lights of the ±n order generated by the diffraction grating 10 and 110.

As far as the beam from a same light source is used, and provided that at least one of the diffraction lights irradiated onto the moving object is the n order diffraction light, the other one can be any other order than the n order, such as 0, n+1, n+2, or the like.

Also, it may be possible to irradiate one of the two beams, which is incident on the light receiving elements from a same light source, onto the moving object as an n order refraction light, while the other is directly incident on the light receiving elements, to obtain the Doppler signals by causing these lights to interfere with the scattering lights from the moving object. In this case, it is necessary to adjust the irradiation position of the beams on the moving object to be in a correct position.

Figure 13:
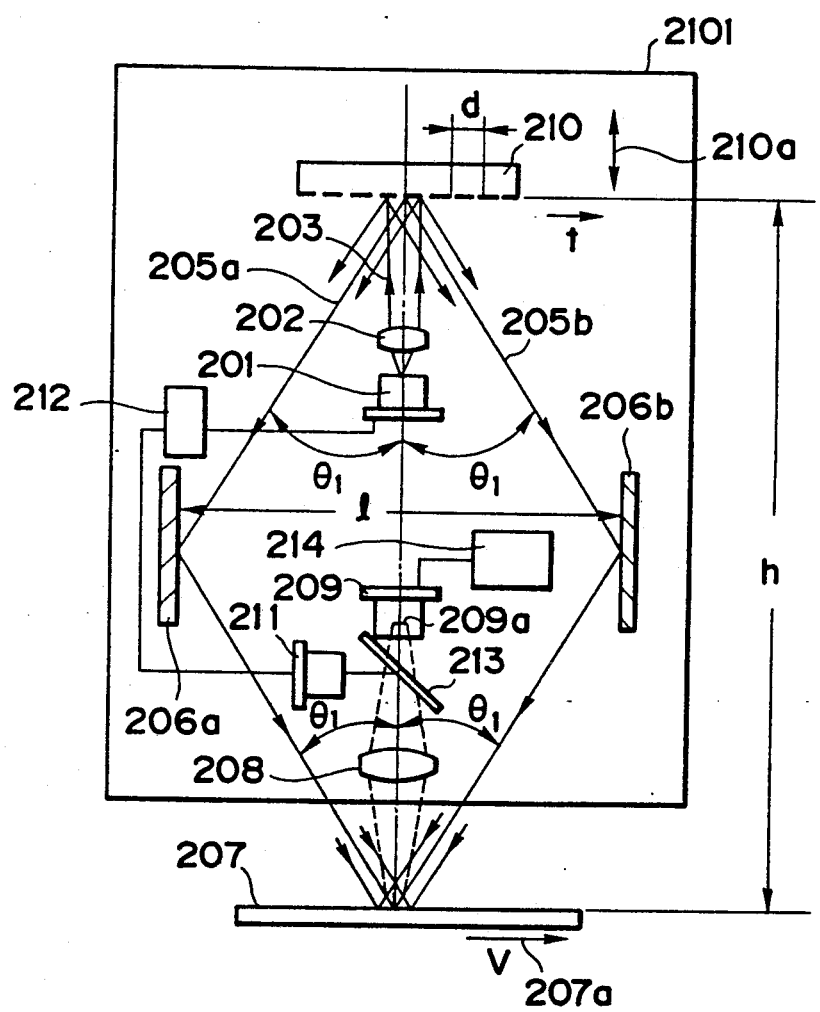
FIG. 13 is a view schematically showing a forth embodiment of the present invention.

FIG. 13 is a view schematically showing the principal part of the optical system of a forth embodiment according to the present embodiment, in which a numeral 2101 designates a Doppler velocimeter. A numeral 201 designates a light source comprising a variable wavelength laser diode capable of varying its oscillating wavelength, for example. As the variable wavelength laser diode 201, it is possible to apply, for example, a variable wavelength DBR-DC-PBH semiconductor laser or the like which enables its oscillating wavelength to be varied by controlling the current injected into the phase control region and distribution reflection (DBR) region.

A numeral 212 designates a controller to control the injected current to the laser diode 201 in response to the output signal from the light receiving means 211 which will be described later, and to change the oscillating wavelengths of the laser diode 201. Hereinafter, the laser diode 201 will be referred to as laser.

A numeral 202 designates a collimator lens to make the beam from the laser 201 to be the parallel beams 203; 210, a diffraction grating having the grating pitch d of 1.6 μm, which is set to refract the ± primary diffraction light of wavelength λ at a diffraction angle $\theta_1$; 206a and 206b, reflection mirrors arranged to face each other; 207, a moving object or moving fluid (hereinafter referred to as moving object) to travel in the direction indicated by arrow 207a at a traveling velocity V; 208, a condenser lens to converge through a half mirror 213 the scattering light with the Doppler shift from the moving object 207 on the detecting surface 209a of a photo detector 209; 211, a light receiving means comprising CCD and others, for example. The surface of the moving object 207 and the detecting surface 209a make a substantially conjugate relationship. Further, the surface of the moving object 207 and the light receiving means 211 also make a substantially conjugate relationship.

A numeral 214 denotes a computing means to obtain the traveling velocity V of the moving object 207 by computing using the Doppler signals obtained by the optical detector 209.

In the present embodiment, the laser light emitted from the laser 201 is made by the collimator lens 202 to be the parallel beams 203 of approximately 2 mm diameter and is incident on the reflection type diffraction grating 210 in the direction perpendicular to the arrangement direction t of the grating. Then, the diffraction lights 205a and 205b of the ±n order (in this respect, n=1) and the wavelength λ diffracted by the diffraction grating 210 at a diffraction angle $\theta_1$ are reflected by the reflection mirrors 206a and 206b respectively arranged perpendicular to the arrangement direction of the grating and are irradiated crosswise onto the moving object 207 each from the different directions at a same incident angle $\theta_1$ so that the spots $L_{5a}$ and $L_{5b}$ are overlapped with each other on the surface of the moving object 207 as in the case of the second embodiment shown in FIG. 9B.

In the present embodiment, with the structure set forth above, an optical system is formed with the diffraction grating, mirrors and others so as to change the diffraction angle (of the diffraction light) of the ±n order from the diffraction grating 210 in response to the variation of the wavelength λ, and change the incident angle θ to the moving object as well; thus making the ratio of sin (θ)/λ substantially constant at that time.

Also, in this case, the two diffraction lights 205a and 205b are the spots $L_{5a}$ and $L_{5b}$ of approximately 2 mm diameter, and the surface of the moving object 207 is irradiated by the two beams.

The condenser lens 208 converges the scattering lights with the frequency shifted by the Doppler shift Δf and −Δf expressed by the equation (1) proportional to the traveling velocity V of the moving object 207 on the detecting surface 109a of the photo detector 209. At this time, the two scattering lights shifted by the Doppler shift Δf and −Δf interfere with each other on the detecting surface 109a. The photo detector 109 detects the quantity of light based on the brightness of the interference fringe at that time. That is the photo detector 109 detects the Doppler signal which does not depend on the oscillating wavelength λ of the laser 101 of the Doppler frequency F.

$$F = 2V/d \quad (5)$$

which is proportional to the traveling velocity V in the equation (4) where n=1 as described earlier. Then, the traveling velocity V is obtained by the equation (5) by the computing means 114 using the output signal from the photo detector 209.

In the present embodiment, the detecting surface 209a and the surface of the moving object 207 are substantially in a conjugate relationship. Therefore, provided that the relative relationship between the positions of the Doppler velocimeter 2101 and moving object 207 is correctly established, the two diffraction lights 205a and 205b are irradiated to allow its spots $L_{5a}$ and $L_{5b}$ to be intersected to overlap with each other on the surface of the moving object 207 as shown in FIG. 9B.

However, if there is an error in establishing the distance between the Doppler velocimeter 2101 and the moving object 207, the spots $L_{5a}$ and $L_{5b}$ of the diffraction lights 205a and 205b are not overlapped on the surface of the moving object 207 and are deviated from each other as shown in FIGS. 9A and 9B. The scattering lights detected by the photo detector 209 are scattering lights from the region where the two spots $L_{5a}$ and $L_{5b}$ are overlapped. Therefore, if the two spots $L_{5a}$ and $L_{5b}$ are not overlapped and begin to deviate from each other, the detecting volume of the scattering lights, which can be detected by the photo detector 109, becomes small to cause the S/N ratio of the Doppler signal to be lowered. Hence, the measuring precision for the traveling velocity V is degraded.

For example, if the spots $L_{5a}$ and $L_{5b}$ of the two diffraction lights 205a and 205b are completely overlapped on the moving object 207 as shown in FIG. 9B, the distance h between the diffraction grating 210 and the moving object 207 is expressed, $$h = l \cdot \sqrt{(d^2 - \lambda^2)} / \lambda \quad (6)$$

where l is the distance between the reflection mirrors 206a and 206b and d is the space between the gratings of the diffraction grating.

Here, if l=50 mm, λ=0.78 μm, and d=1.6 μm, h is equal to 89.5 mm. If the distance h is fluctuated by 1 mm, the oscillating wavelength λ from the laser 201 should be modified, for example, by approximately 6 nm in accordance with the equation (6) to enable the two spots $L_{5a}$ and $L_{5b}$ to be overlapped completely with each other.

Therefore, in the present embodiment, the overlapping condition of the two spots $L_{5a}$ and $L_{5b}$ on the surface of the moving object 207 is detected by the light receiving means 211 comprising CCD and others through the half mirror 213. Then, for example, when the output distribution of the output signals obtained by the light receiving means 211 becomes minimum, it is established that the two spots $L_{5a}$ and $L_{5b}$ are completely overlapped, and the oscillating wavelength from the laser 201 is variously modified in order to gain such output signals. In other words, as clear from the equation (3), the feature of the present invention is that the wavelength λ is modified to change the diffraction angle $\theta_1$ from the diffraction grating for the adjustment of the incident angle $\theta_1$ of the two diffraction lights 205a and 205b irradiated onto the surface of the moving object 207, thereby adjusting the overlapping condition of the spots $L_{5a}$ and $L_{5b}$.

Specifically, utilizing the output signals from the light receiving means 211, the injected current to the laser 201 is varied by the controller 212 to modify the oscillating wavelength λ from the laser 201. Then, the diffraction angle $\theta_1$ of the diffraction light, with the wavelength λ of the specific order (± primary order) diffracted by the diffraction grating 210, is changed and at the same time, the incident angle $\theta_1$ to the surface of the moving object 207 is changed. Hence, the two spots $L_{5a}$ and $L_{5b}$ are suitably intersected to overlap with each other on the surface of the moving object 207 as shown in FIG. 9b, for example. To judge whether the deviation of the spots is in such state as shown in FIG. 9A or in FIG. 9C, the wavelength λ is vibrated with the method shown in FIG. 10 and FIG. 11 instead of the vibration of the diffraction grating, and the required proces is executed likewise as judged from the phase. In this case, the operation to move the diffraction grating away and the operation to elongate the wavelength is equivalent.

Thus, in the present embodiment, it is possible to detect the traveling velocity V of the moving object 207 with a high precision by maintaining the S/N ratio of the Doppler signals obtained by the optical detector 209 in an exellent condition.

The present embodiment has a feature that the overlapping condition of the spots $L_{5a}$ and $L_{5b}$ can be adjusted at a high speed because the modification of the oscillating wavelength from the laser 201 is made at a high speed in response to the variation of the injected current to the laser 201 to follow the mechanical fluctuation of the velocity sufficiently.

Although the reflection type diffraction grating is used for the present embodiment, it is also possible to apply the transmission type diffraction grating in the same manner. Also, it may be possible to use the diffraction light of the second order or more as the diffraction light besides the ± primary diffraction light.

Also, the laser light 203 is incident on the diffraction grating 210 at a specific incident angle, not necessarily at an angle perpendicular to thereto. Then, the two diffraction lights of ±n order should be irradiated onto the moving object while maintaining the same intersecting angle as that of the two diffraction lights of ±n order generated by the diffraction grating 210.

As far as the same beam from a same light source is used, and provided that at least one of the refraction lights irradiated onto the moving object is the n order refraction light, the other can be any order other than the n order, such as 0, n+1, n+2, or the like.

Also, it may be possible to irradiate one of the two beams to be inputted into the light receiving elements from a same light source onto the moving object as an n order refraction light, while inputting the other one directly into the light receiving elements, to obtain the Doppler signals by causing these lights to interfere with the scattering lights from the moving object. In this case, it is necessary to adjust the irradiating position of the beam on the moving object to be in a correct position.

In the present embodiment, when the Doppler velocimeter is assembled and adjusted, or at the time of initialization thereof, the oscillating wavelength from the laser 201 should be taken out sweepingly from several nm to several 10 nm to fix the wavelength where the Doppler signal detected from the photodetector 209 becomes the greatest (the state shown in FIG. 9b). Subsequently, using a known means for detecting distance such as a trigonometrical range finding method or image deviation detecting method employed in a camera or the like, the distance from the predetermined position of the Doppler velocimeter 2101 (diffraction grating 210, for example) to the moving object 207 is detected. Then, it may be possible to adjust the overlapping condition of the spots $L_{5a}$ and $L_{5b}$ on the surface of the moving object 207 by modifying the oscillating wavelength λ from the laser 201 in accordance with the difference from the designed value.

Also, in the present embodiment, it may be possible to perform the conditioning of the two diffraction lights 205a and 205b on the surface of the moving object 207 by the use of the photodetector 209 for detecting the traveling velocity without using the light receiving means 211 (in this case, the half mirror 213 is not required).

For example, the transmission wavelength from the laser 201 is modified by the controller 212 so as to maximize the detection signal from the photodetector 209. In other words, it may also be possible to make the adjustment by minimizing the spot diameter.

Also, in the present embodiment, it may be possible to use a usual laser diode which modifies its wavelength by temperature changes by adjusting the temperature for the use thereof, instead of the laser 201 which modifies its oscillating wavelength by the variation of the injected current.

Also, it may be possible to adjust by varying the injected current the overlapping condition of the spots $L_{5a}$ and $L_{5b}$ which has generated a deviation because of the varied wavelength due to the temperature change.

We claim:

1. An apparatus for detecting velocity information of an object, including:
   irradiating means for performing an irradiation of two beams substantially having coherency to almost same positions on the object;
   photo-detection means, for detecting an interfering light from the irradiated positions by said irradiating means, thereby to obtain the velocity information of said object;
   means for detecting a condition of the irradiation to detect positional deviating information between the two beams on said object; and
   means for adjusting the condition of the irradiation to adjust the irradiating positions of said two beams on the object based on a detection result by said means for detecting the condition of the irradiation.

2. An apparatus according to claim 1, wherein said irradiating means comprises an optical system and irradiates said two beams to form fringes at said almost same positions, and said optical system is arranged in such a manner that even when a wavelength of said two beams fluctuates, a space between said fringes is not changed.

3. An apparatus according to claim 1, wherein said irradiating means comprises an optical system, which is arranged in such a manner that sin $(\theta)/\lambda$ is constant, where $\theta$ is an incident angle of said two beams by said optical system to the object, and $\lambda$ is a wavelength of said two beams.

4. An apparatus according to claim 1, wherein said irradiating means comprises a light source, a diffraction grating for diffracting the light from said light source, and deflecting means for deflecting lights of ±n order diffracted by said diffraction grating where n is a natural number, and beams deflected by said deflecting means respectively are irradiated to said almost same positions of the object.

5. An apparatus according to claim 4, wherein said deflecting means includes parallel reflection planes for reflecting the lights of said ±n order respectively, and the lights reflected by said parallel reflection planes respectively are irradiated to said almost same positions on the object.

6. An apparatus according to claim 4, wherein said means for adjusting the condition of the irradiation adjusts the irradiating position of said two beams on the object by controlling a position of said diffraction grating based on the detection result of said means for detecting the condition of the irradiation.

7. An apparatus according to claim 4, wherein said deflecting means includes separating means for separating a part of at least one of the lights of said ±n order, which is irradiated to a position different from said almost same positions, and said means for detecting the condition of the irradiation detects the deviating information of said two beams by detecting the incident position on the object of the light separated by said separating means.

8. An apparatus according to claim 1, wherein said means for adjusting the condition of the irradiation adjusts the irradiating positions of said two beams on the object by controlling the entire position of said irradiating means based on the detection result of said means for detecting the condition of the irradiation.

9. An apparatus according to claim 1, wherein said means for adjusting the condition of the irradiation adjusts the irradiating positions of said two beams on the object by controlling the wavelength of said two beams based on the detection result of said means for detecting the condition of the irradiation.

10. An apparatus according to claim 1, wherein said means for detecting the condition of the irradiating detects the deviating information of said two beams by directly detecting an overlapping condition of said two beams on the object.

11. An apparatus according to claim 1, wherein said photo-detection means outputs Doppler frequency signals in response to a traveling velocity of the object by detecting the scattering lights from the object, and the velocity information of the object is detected by the Doppler frequency signals.

12. A method of detecting velocity information of an object, including the steps of:
irradiation of two beams substantially having coherency to almost same positions on the object;
detection of interfering lights from the irradiated positions of the beams, the velocity information of the object being obtained by said detection;
detection of positional deviating information between the the two beams on the object; and
adjustment of irradiating positions of said two beams on the object based on a detection result of said detection of the deviating information.

13. A method according to claim 12, wherein said step of irradiation is performed to form fringes at said almost same positions, and the irradiation is performed in such a manner that even when the wavelength of said two beams fluctuates, the space between said fringes is not changed.

14. A method according to claim 12, wherein said step of irradiation is performed in such a manner that sin $(\theta)/\lambda$ is constant, where $\theta$ is an incident angle of said two beams by said optical system to the object, and $\lambda$ is a wavelength of said two beams.

15. A method according to claim 12, wherein said step of irradiation is performed by the use of a light source, a diffraction grating for diffracting the light from said light source, and deflecting means for deflecting the lights of $\pm n$ order diffracted by said diffraction grating where n is a natural number, and the beams deflected by said deflecting means, respectively, are irradiated to said almost same positions of the object.

16. A method according to claim 15, wherein said deflecting means includes parallel reflection planes for reflecting the lights of said $\pm$ order respectively, and the lights reflected by said parallel reflection planes respectively are irradiated to the almost same positions on the object.

17. A method according to claim 15, wherein said step of adjustment of the condition of the irradiation is performed by controlling the position of said diffraction grating based on the detection result of said detection of the irradiating positions.

18. A method according to claim 15, wherein said deflecting means includes separating means for separating a part of at least one of the lights of said $\pm n$ order, which is irradiated to a position different from said almost same positions, and said step of detecting the deviating information is performed by detecting an incident position on the object of the light separated by said separating means.

19. A method according to claim 12, wherein said step of adjustment of the condition of the irradiation is performed by controlling an entire position of a member performing the irradiating based on the detection result of said detection of the irradiating positions.

20. A method according to claim 12, wherein said step of adjustment of the irradiating positions is performed by controlling a wavelength of said two beams based on the detection result of said detection of the irradiating positions.

21. A method according to claim 12, wherein said step of detecting the irradiating positions is performed by directly detecting an overlapping condition of said two beams on the object.

22. A method according to claim 12, wherein said step of detection of interfering lights includes an output of Doppler frequency signals in response to a traveling velocity of the object by detecting scattering lights from the object, and the velocity information of the object is detected by said Doppler frequency signals.

23. An apparatus for detecting velocity information of an object, including:
a light source for emitting a beam substantially having coherency;
an irradiation optical system for separating the beam from said light source into two beams, and irradiating said two beams to a substantially same position on the object;
a photodetector for detecting interfering lights from the irradiated position irradiated by said irradiation optical system, whereby the velocity information of the object is obtained;
a sensor for detecting positional deviating information between said two beams on the object; and
a modulator for adjusting an irradiating position of said two beams on the object based on a detection result of said sensor.

24. An apparatus for detecting information related to a displacement of an object, including:
irradiating means for performing an irradiation of two beams substantially having coherency to almost same positions on the object;
photodetection means for detecting interfering lights from the irradiated positions by said irradiating means, whereby the information related to the displacement of said object is obtained by said detection;
means for detecting a condition of the irradiation to detect positional deviating information between the two beams on said object; and
means for adjusting the condition of the irradiation to adjust the irradiating positions of said two beams on the object based on a detection result of said means for detecting the condition of the irradiation.

25. An apparatus according to claim 24, wherein said apparatus comprises means for computing a traveling velocity of the object as information related to said displacement based on a detection result of said photo-detection means.

26. An apparatus for detecting information related to a displacement of an object, including;
a light source for emitting a beam substantially having coherency;
an irradiation optical system for separating the beam from said light source into two beams, and irradiating said two beams to a substantially same position on the object;
a photodetector for detecting interfering lights from the irradiated position irradiated by said irradiation optical system, whereby the information related to the displacement of the object is obtained;
a sensor for detecting positional deviating information between said two beams on the object; and
a modulator for adjusting the irradiating position of said two beams on the object based on the detection result of said sensor.

27. A apparatus according to claim 26, wherein said apparatus includes an electronic computer for computing the traveling velocity of the object as information related to said displacement based on the the detection result of said photodetector.

* * * * *

UNITED STATES PATENT AND TRADEMARK OFFICE
CERTIFICATE OF CORRECTION

PATENT NO. : 5,194,745

DATED : March 16, 1993

INVENTOR(S) : MAKOTO TAKAMIYA, ET AL.

It is certified that error appears in the above-identified patent and that said Letters Patent is hereby corrected as shown below:

Title page,
IN [57] ABSTRACT

Line 14, "lightning" should read --lighting--.

COLUMN 1

Line 33, "an" should read --a--.
    Line 37, "splitted" should read --split--.
    Line 38, "splitted" should read --split--.

COLUMN 2

Line 45, "is" should read --is the--.

COLUMN 3

Line 16, "same" should read --the same--.
    Line 26, "an" should read --a--.

COLUMN 4

Line 6, "beam-splitted" should read --beam-split-- and "rights 5a" should read --lights 5a--.
    Line 10, "splitted" should read --split--.
    Line 15, "at a" should read --at an--.
    Line 59, "are" (first occurrence) should read --and--.
    Line 68, "face" should read --fact--.

COLUMN 5

Line 10, "6BC" should read --6BC,--.

UNITED STATES PATENT AND TRADEMARK OFFICE
CERTIFICATE OF CORRECTION

PATENT NO.  : 5,194,745
DATED       : March 16, 1993
INVENTOR(S) : MAKOTO TAKAMIYA, ET AL.

It is certified that error appears in the above-identified patent and that said Letters Patent is hereby corrected as shown below:

COLUMN 6

Line 11, "splitted" should read --split--.
   Line 13, "splitted," should read --split,--.

COLUMN 7

Line 27, "is" should read --is,--.

COLUMN 15

Line 15, "the the" should read --the--.
   Line 40, "± order" should read --±n order--.

Signed and Sealed this

Twenty-sixth Day of April, 1994

*Attest:*

BRUCE LEHMAN

*Attesting Officer*      *Commissioner of Patents and Trademarks*